United States Patent
Zurbrick et al.

(10) Patent No.: US 7,788,629 B2
(45) Date of Patent: Aug. 31, 2010

(54) SYSTEMS CONFIGURED TO PERFORM A NON-CONTACT METHOD FOR DETERMINING A PROPERTY OF A SPECIMEN

(75) Inventors: Larry Steven Zurbrick, San Jose, CA (US); Harold William Lehon, San Jose, CA (US)

(73) Assignee: KLA-Tencor Technologies Corp., Milpitas, CA (US)

( * ) Notice: Subject to any disclaimer, the term of this patent is extended or adjusted under 35 U.S.C. 154(b) by 755 days.

(21) Appl. No.: 11/181,358

(22) Filed: Jul. 14, 2005

(65) Prior Publication Data

US 2006/0036979 A1 Feb. 16, 2006

Related U.S. Application Data

(60) Provisional application No. 60/589,864, filed on Jul. 21, 2004.

(51) Int. Cl.
 *G06F 17/50* (2006.01)
(52) U.S. Cl. .................................... 716/21; 716/19
(58) Field of Classification Search ............ 716/19–21; 430/5, 22, 30
 See application file for complete search history.

(56) References Cited

U.S. PATENT DOCUMENTS

| | | | |
|---|---|---|---|
| 6,235,434 B1 | 5/2001 | Sweeney et al. | |
| 6,408,219 B2 | 6/2002 | Lamey, Jr. et al. | |
| 6,529,621 B1 * | 3/2003 | Glasser et al. | 382/144 |
| 6,593,040 B2 | 7/2003 | Smith | |
| 6,674,522 B2 | 1/2004 | Krantz et al. | |
| 6,727,512 B2 | 4/2004 | Stokowski et al. | |
| 6,750,000 B2 | 6/2004 | Tanaka et al. | |
| 6,757,645 B2 * | 6/2004 | Chang et al. | 703/13 |
| 6,966,047 B1 * | 11/2005 | Glasser | 716/19 |
| 6,976,240 B2 * | 12/2005 | Chang | 716/19 |
| 7,003,755 B2 * | 2/2006 | Pang et al. | 716/19 |
| 7,043,071 B2 * | 5/2006 | Qian et al. | 382/144 |
| 7,107,571 B2 * | 9/2006 | Chang et al. | 716/19 |
| 2002/0083408 A1 | 6/2002 | Haffner et al. | |
| 2003/0161525 A1 | 8/2003 | Bruce et al. | |
| 2006/0051682 A1 * | 3/2006 | Hess et al. | 430/5 |
| 2006/0236294 A1 * | 10/2006 | Saidin et al. | 716/19 |

FOREIGN PATENT DOCUMENTS

| | | |
|---|---|---|
| WO | 99/59200 | 11/1999 |
| WO | WO2004/040626 | 5/2004 |

OTHER PUBLICATIONS

Patent Abstracts of Japan, Publication No. 2002014459, published Jan. 18, 2002.
International Search Report, PCT/US2006/025003, mailed Mar. 3, 2006.

* cited by examiner

*Primary Examiner*—Jack Chiang
*Assistant Examiner*—Binh C Tat
(74) *Attorney, Agent, or Firm*—Ann Marie Mewherter (57) ABSTRACT

Systems configured to perform a non-contact method for determining a property of a specimen are provided. One system configured to perform a non-contact method for determining a property of a specimen includes a focused biasing device configured to provide a stimulus to a focused spot on the specimen. The system also includes a sensor configured to measure a parameter of a measurement spot on the specimen. The measurement spot overlaps the focused spot. The system further includes a processor configured to determine the property of the specimen from the parameter.

19 Claims, 3 Drawing Sheets

SYSTEMS CONFIGURED TO PERFORM A NON-CONTACT METHOD FOR DETERMINING A PROPERTY OF A SPECIMEN

PRIORITY CLAIM

This application claims priority to U.S. Provisional Application No. 60/589,864 entitled "Computer-Implemented Methods for Generating Input for a Simulation Program or Generating a Simulated Image of a Reticle," filed Jul. 21, 2004, which is incorporated by reference as if fully set forth herein.

BACKGROUND OF THE INVENTION

1. Field of the Invention

The present invention generally relates to computer-implemented methods for generating input for a simulation program or generating a simulated image of a reticle. Certain embodiments relate to a computer-implemented method that includes combining information about a defect detected on a partially fabricated reticle with information about phase assigned to an area of the reticle proximate to the defect.

2. Description of the Related Art

The following description and examples are not admitted to be prior art by virtue of their inclusion in this section.

Semiconductor fabrication processes typically involve a number of lithography steps to form various features and multiple levels of a semiconductor device. Lithography involves transferring a pattern to a resist formed on a semiconductor substrate, which may be commonly referred to as a wafer. A reticle, or a mask, may be disposed above the resist and may have substantially transparent regions and substantially opaque regions configured in a pattern that may be transferred to the resist. For example, substantially opaque regions of the reticle may protect underlying regions of the resist from exposure to an energy source. The resist may, therefore, be patterned by selectively exposing regions of the resist to an energy source such as ultraviolet light, a beam of electrons, or an x-ray source. The patterned resist may then be used to mask underlying layers in subsequent semiconductor fabrication processes such as ion implantation and etch. Therefore, a resist may substantially inhibit an underlying layer such as a dielectric material or the semiconductor substrate from implantation of ions or removal by etch.

There are several types of reticles that are commercially available. For example, a binary reticle is a reticle having patterned areas that are either transparent or opaque. Binary reticles are different from phase-shift masks (PSM), one type of which may include films that only partially transmit light, and these reticles may be commonly referred to as halftone or embedded phase-shift reticles. If a phase-shifting material is placed on alternating clear spaces of a reticle, the reticle is referred to as an alternating PSM, an ALT PSM, or even a Levenson PSM. One type of phase-shifting material that is applied to arbitrary layout patterns is referred to as an attenuated or halftone PSM, which may be fabricated by replacing the opaque material with a partially transmissive or "halftone" film. A ternary attenuated PSM is an attenuated PSM that includes completely opaque features as well. Each of the reticles described above may also include a pellicle, which is an optically transparent membrane that seals off the reticle surface from airborne particulates and other forms of contamination.

A process for manufacturing a reticle is similar to a wafer patterning process. For example, the goal of reticle manufacturing is forming a pattern in an opaque material such as a relatively thin chrome layer on a substantially transparent substrate such as glass. In particular, reticle manufacturing may include a number of different steps such as pattern generation, which may include moving a glass substrate having a chrome layer and a resist layer formed thereon under a light source as shutters are moved and opened to allow precisely shaped patterns of light to shine onto the resist thereby creating the desired pattern.

Alternatively, reticles may be made with laser or e-beam direct write exposure. Laser exposure allows the use of standard optical resists and is faster than e-beam direct write exposure. In addition, laser systems are also less expensive to purchase and operate. Direct write laser sources are turned on and off with an acousto-optical modulator (AOM) or a digital multi-mirror. An example of a commercially available direct write laser system is the ALTA 3000® laser writer from Applied Materials, Inc., Santa Clara, Calif. Direct write e-beam systems are often used to manufacture complex reticles since they produce finer line resolution than laser systems. Examples of commercially available direct write e-beam systems include the MEBES 4500 and 5000 systems from Applied Materials. Other exposure types are also possible such as raster scan e-beam systems, vector scan e-beam systems, and quasi vector/raster scan e-beam systems.

After the exposure steps, the reticle is processed through development, inspection, etch, strip, and inspection. Defects in reticles are a source of yield reduction in integrated circuit manufacturing. Therefore, inspection of a reticle is a critical step in the reticle manufacturing process. As minimum pattern sizes shrink and integrated circuits are designed with higher device densities, defects that were once tolerable may no longer be acceptable. For example, a single defect may be repeated in each die in stepper systems and may destroy every die in single-die reduction reticles. In addition, due to the critical dimension (CD) budget of VLSI and ULSI-level integrated circuit manufacturing, the CD budget allowed for reticles requires substantially defect-free and dimensionally perfect reticles. For example, the overall CD budget for such integrated circuits may be approximately 10% or better thereby resulting in a CD budget for a reticle with about a 4% error margin.

Defects may be a result of incorrect designing of the reticle pattern and/or flaws introduced into the patterns during the pattern generation process. Even if the design is correct, and the pattern generation process is performed satisfactorily, defects in the reticle may be generated by the reticle fabrication process as well as during subsequent processing and handling. In addition to the many potential causes of defects, there are also many different types of defects. For example, bubbles, scratches, pits, and fractures may be a result of a faulty raw glass substrate. Defects in the opaque material may include particulate inclusions in the material, pinholes or voids in the material surface, and invisible chemical anomalies such as nitrides or carbides that may lead to erratic local etching and undesired patterns. Defects such as voids in the resist layer may produce pinholes that may lead to voids in the attenuating film. In addition, localized characteristics in the resist may also produce variations in characteristics of the resist such as resist solubility across the reticle substrate. Particulate matter may also be introduced to the reticle during processing and/or handling of the reticle. Defects that may result in inoperative devices or which would cause a die to be rejected at final wafer inspection are commonly referred to as "fatal" or "killer" defects, while others may be commonly referred to as "nonfatal" defects.

There are several methods that have been used to inspect reticles for defects. One method includes inspecting and repairing every defect detected after the first patterning/processing step. If too many defects are detected, the reticle is rejected (i.e., scrapped). In this method, no or little consideration is given to the defect's printability since only partial knowledge exists about the defect's final optical nature. Therefore, this method does not take into consideration the lithographic significance of individual defects in the reticle dispositioning decisions. Another method includes inspecting and repairing everything detected after the second or final patterning/processing step. In this method, if too many or non-repairable defects are detected, the reticle is rejected. Since phase defect repair is very difficult and/or expensive and/or has a significant impact on cycle time, in this method there is a greater likelihood of rejection of the completed mask/reticle.

In a different method, inspection is performed after the second or final patterning/processing step, and the impact of the defects on a printed image of the reticle is determined using an aerial image analysis tool. Only lithographically significant defects are repaired. As described above, since phase defect repair is very difficult and/or expensive and/or has a significant impact on cycle time, there is a greater likelihood of rejection of the completed mask/reticle. In another method, a reticle may be inspected using an aerial image inspection tool after the second or final patterning/processing step, and the detected defects may be repaired. By definition, these defects should be the lithographically significant defects. However, this method assumes that an aerial image inspection tool with sufficient sensitivity can be obtained to meet the A critical dimension ($\Delta CD$) defect criteria. The major disadvantage of this method is that all patterning and processing steps need to be completed in order to make use of an aerial image inspection tool thereby requiring investment of the full cycle time and expense.

Accordingly, it may be desirable to develop a method for inspecting and/or evaluating defects on a reticle that eliminates one or more of the disadvantages of the methods described above.

SUMMARY OF THE INVENTION

The following description of various embodiments of computer-implemented methods is not to be construed in any way as limiting the subject matter of the appended claims.

In general, the methods described herein make use of a priori knowledge regarding potential defect phase information based upon a fixed mask making process and in-situ defect inspection that is "fed forward" to a lithography simulation program such as PROLITH, which is commercially available from KLA-Tencor, San Jose, Calif., in order to make a judgment about whether a defect should be repaired or left alone or whether the plate should be rejected. "In situ" defect inspections are generally defined herein as inspections that are performed before a mask or reticle is completed. Advanced technology masks and reticles make use of multiple patterning and processing steps. For example, phase shift type reticles are fabricated using multiple patterning and processing steps in which transmission (i.e., amplitude) information is added at the first patterning step and phase information is added at the second patterning step. A defect detected after the first patterning step may or may not have a phase component after the second patterning step based upon the spatial relationship of the second level patterning data with respect to the first level patterning data. In general, defects containing a phase component tend to have greater lithographic significance than those that do not have a phase component.

It is advantageous to determine the quality of a reticle as early as possible in the mask making process in order to minimize cycle time and manufacturing costs. However, many resolution enhancement techniques (RETs) make use of phase shifting reticles, which are fabricated using multiple patterning and processing steps as described above. These multiple steps add significant cycle time and manufacturing expense. It is, therefore, desirable to determine the quality of a reticle before the completion of all patterning and process steps so as to avoid adding further value to the reticle if a fatal defect exists due to an earlier patterning/process step. This determination can be difficult since a defect generated in the first patterning step may or may not have a phase component that has not yet been added to the reticle since this will occur in later patterning/process steps.

The methods described herein make use of the second level patterning data to aid in the determination of the location of phase areas on the reticle, which can be fed forward to an optical lithography simulation program. Furthermore, based upon a priori knowledge of the mask making process and the defect's location relative to the phase pattern information, phase information can be assigned to the defect to improve the accuracy of the simulation results. This method can be implemented as a component of a multi-level database inspection in which the phase information from the database is overlaid with the optical image of the defect and stored to a file that is used as input to the optical simulation program.

The methods described herein can overcome many of the disadvantages of previous methodologies since the reticle does not need to be completed in order to estimate a defect's lithographic significance. Furthermore, the methods described herein can be operated in a "hybrid" die to die mode where the second level phase data is database generated and overlaid to the optical image of a defect. It is also possible to perform a printability assessment on a first level of a reticle after inspection for certain defect types such as local critical dimension (CD) variation.

An embodiment relates to a computer-implemented method for generating input for a simulation program. The method includes combining information about a defect detected on a partially fabricated reticle with information about phase assigned to an area of the reticle proximate to the defect. The phase is to be added to the reticle on a level other than a level on which the defect is formed. In one embodiment, the information about phase includes information from a database. In another embodiment, the information about phase includes information about a reticle fabrication process.

In an embodiment, the defect is detected on the reticle prior to addition of the phase to the reticle. In some embodiments, the defect is detected on the reticle after a first patterning step of a reticle fabrication process and before a second patterning step of the reticle fabrication process. In an additional embodiment, the defect is formed in a step of a reticle fabrication process in which no phase information is imparted to the reticle.

In another embodiment, the simulation program uses the input to determine printability of the defect. In a further embodiment, the simulation program uses the input to determine lithographic significance of the defect. Each of the embodiments of the method described above may include any other step(s) described herein.

Another embodiment relates to a computer-implemented method for generating input for a simulation program. The method includes combining information about one or more features formed on a partially fabricated reticle with information about phase assigned to an area of the reticle proximate to the one or more features. The phase is to be added to the reticle on a level other than a level on which the one or more features are formed. This embodiment of the method may also include any other step(s) described herein.

Another embodiment relates to a different computer-implemented method. The method includes generating a simulated image of a defect on a reticle using information about the defect generated by inspection of one level of the reticle in combination with information about a different level on the reticle. In one embodiment, the inspection is performed before the reticle is completely fabricated. In another embodiment, the one level of the reticle includes a completely unpatterned reticle. In a different embodiment, the inspection is performed after a first patterning step of a reticle fabrication process and before a second patterning step of the reticle fabrication process.

In one embodiment, the information about the different level on the reticle includes information from a database. In some embodiments, the one level includes a non-phase shifted level of the reticle. In another embodiment, generating the simulated image includes assigning phase information to the defect.

The method may also include determining printability of the defect from the simulated image. In another embodiment, the method includes determining lithographic significance of the defect from the simulated image. In an additional embodiment, the method includes determining a process window of the reticle from the simulated image of the defect. In a further embodiment, the method includes using the simulated image to analyze the electrical impact of the defect on a device that will be fabricated using the reticle.

In some embodiments, the method includes determining from the simulated image if the reticle should be rejected or if additional fabrication of the reticle should be performed. In additional embodiments, the method includes determining from the simulated image if the defect should be repaired or not. In another embodiment, the method includes generating a repair process recipe for the defect based on the simulated image, the information about the defect, or a combination thereof.

In a further embodiment, the method includes modifying a design of the reticle for one or more write steps to be performed subsequent to the inspection to correct the defect. In one such embodiment, the method includes creating a file for a mask writing tool that can be used to perform the one or more write steps based on the modified design.

In another embodiment, the method includes determining one or more parameters of one or more wafer manufacturing processes based on the simulated image of the defect, the information about the defect, or a combination thereof. In an additional embodiment, the method includes determining a process control recipe based on critical areas in the reticle created by the defect and additional defects detected by the inspection. Each of the embodiments of the method described above may include any other step(s) described herein.

A different embodiment relates to another computer-implemented method. This method includes generating a simulated image of one or more features on one level of a reticle using information about the one or more features generated by metrology in combination with information about a different level on the reticle. The different level is not formed on the reticle prior to the metrology.

In one embodiment, the method includes generating a simulated image of the one or more features as described above at different lithography process parameters to generate additional simulated images of the one or more features. Such an embodiment may also include determining a process window of the reticle from the additional simulated images. In another embodiment, the method includes using the simulated image to simulate a device pattern that would be printed on a wafer using the reticle. Such an embodiment may also include determining electrical characteristics of the device pattern and determining electrical performance of a device formed from the device pattern. Each of the embodiments of the method described above may include any other step(s) described herein.

Further embodiments relate to a carrier medium that includes program instructions executable on a processor to perform one or more of the computer-implemented methods described herein. Additional embodiments relate to a system that includes a processor and program instructions executable on the processor to perform one or more of the computer-implemented methods described herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "reticle" refers to a reticle or a mask. A reticle generally includes a transparent substrate such as glass, borosilicate glass, and fused silica having a layer of opaque material formed thereon. A reticle may include additional materials formed under the opaque material such as an adhesion layer. In addition, a reticle may include additional materials formed on top of the opaque material such as a bottom anti-reflective coating, a resist, and a top anti-reflective layer. The opaque material layer may be patterned to form opaque regions on the substrate. Alternatively, the opaque regions may be replaced by regions etched into the transparent substrate. A reticle, as described herein, may or may not include a pellicle.

Different types of reticles include, but are not limited to, a clear-field reticle, a dark-field reticle, a binary reticle, a phase-shift mask (PSM), an alternating PSM, an attenuated or halftone PSM, and a ternary attenuated PSM, which are described in more detail above. A reticle may also include optical proximity correction (OPC) features. OPC features are designed to reduce distortions of an image printed using the reticle by reducing optical proximity effects. The term "optical proximity effects" generally refers to variations in lateral dimensions or shapes of printed features due to the proximity of other features on the reticle. Such effects may be reduced by determining the distortions due to the optical proximity effects and altering the features on the reticle to compensate for such distortions.

The term "reticle" as used herein also refers to a partially fabricated reticle unless otherwise specified using a term such as "a completely fabricated reticle." In other words, the terms "reticle" and "partially fabricated reticle" are used interchangeably herein. A partially fabricated reticle may be a reticle plate that has undergone a first patterning step of a reticle fabrication process but not a second patterning step of the reticle fabrication process. The term "first patterning step" as used herein is defined as a reticle patterning step that is performed before phase is added to the reticle in another patterning step (e.g., in a "second patterning step"). In one such example, no phase information may be imparted to the reticle plate in the first patterning step. Instead, in many reticle fabrication processes, the first patterning step is designed to add only transmission (amplitude) characteristics to the reticle plate. In addition, the terms "first" and "second" are relative terms (i.e., one or more patterning steps may be performed before the first patterning step and one or more patterning steps may be performed after the second patterning step).

As used herein, the term "phase" is used to refer to the degree to which a portion of a reticle alters the phase of the light transmitted through the portion of the reticle. For example, a portion of a reticle may be designed to alter the phase of the light transmitted through that portion of the reticle by 180 degrees or another fixed number of degrees. Phase may be imparted to light transmitted through a reticle using a variety of different "phase shifting features." The phase shifting features can include etched portions of the reticle substrate. Alternatively, the phase shifting features can include material added to the reticle that is substantially transparent to the wavelength of light at which the reticle will be used. Examples of various types of phase shifting features and various manufacturing methods are illustrated in U.S. Pat. No. 6,750,000 to Tanaka et al., which is incorporated by reference as if fully set forth herein.

Figure 1:
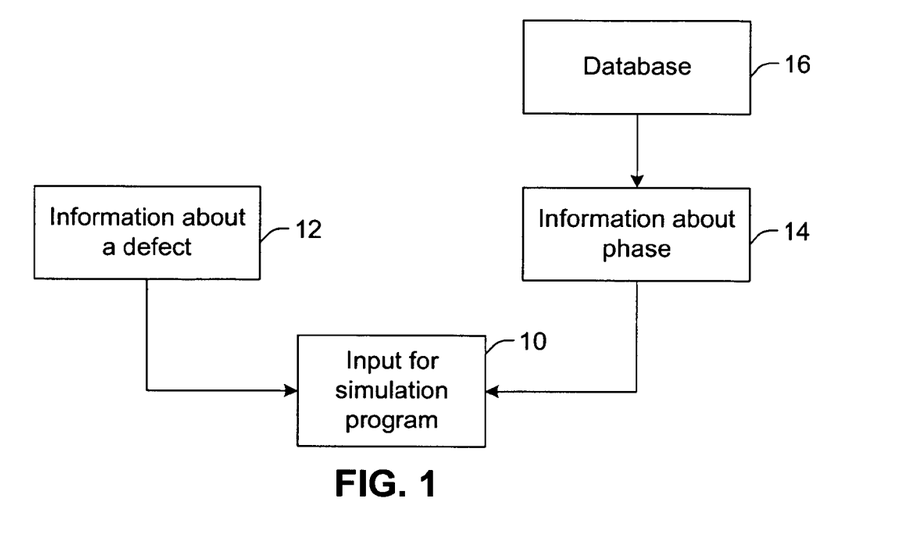
FIG. 1 is a flow chart illustrating one embodiment of a computer-implemented method for generating input for a simulation program.

Turning now to the drawings, FIG. 1 illustrates one embodiment of a computer-implemented method for generating input 10 for a simulation program. The input may take the form of a file or any other suitable form of input for a simulation program. The simulation program may be an optical simulation program. For example, the simulation program may be configured to simulate the optical performance of a reticle. The simulation program may be configured to perform additional functions described herein. One particular example of an appropriate simulation program includes PRO-LITH, which is commercially available from KLA-Tencor, San Jose, Calif. However, the simulation program may include any appropriate simulation program known in the art.

The method includes combining information 12 about a defect detected on a partially fabricated reticle with information 14 about phase assigned to an area of the reticle proximate the defect. The phase is to be added to the reticle on a level other than a level on which the defect is formed. In other words, the defect is detected on the reticle prior to addition of the phase to the reticle, and information about the defect is combined with information about the phase that has not been added to the reticle at the time of the reticle inspection. For example, the defect may be detected on the reticle before the reticle is patterned. In other words, the defect may be detected on a completely un-patterned reticle. In another example, the defect may be detected on the reticle after a first patterning step of a reticle fabrication process. In this step, no phase information is imparted to the reticle. In other words, in the first patterning step, only transmission information is added to the reticle. The phase is added to the reticle in a second, or subsequent, patterning step of the reticle fabrication process after the reticle inspection has been performed. As set forth in detail above, the term "first patterning step" as used herein refers to a patterning step that is followed by another patterning step in which phase shifting features are added to the reticle. In such an embodiment, the information about the phase that is used in the methods described herein will generally include only information about the phase shifting features that have not yet been added to the reticle.

The information about the phase may include information from database 16. Database 16 may be a database that includes information about the reticle layout. The layout of the reticle may be determined from data in a circuit pattern database. A layout of a reticle generally includes a plurality of polygons that define features in a pattern on the reticle. In the case of a reticle that has phase shifting features, the database may include layouts for different levels of the reticle. In other words, the database may include layouts for different patterning steps that are performed on the reticle to form different features of the reticle. For example, one layout may define the transmittance features that will be added in one patterning step, and another layout may define the phase shifting features that will be formed in a different patterning step.

Data representing a layout of a reticle may have any form readable by a simulation program and/or a processor as described herein. For example, the data may be provided to the simulation program as a GDSII file or other standard file description of the reticle or at least a region of the reticle in which the defect is located. The data may describe one or more features and spatial positions associated with the features. Each feature may also include one or more polygons or other shapes as described herein, and a spatial position within the reticle may also be associated with each of the polygons or shapes.

In a different embodiment, information 14 about the phase may include information about a reticle fabrication process. Such information may be obtained from a database such as a fab database. A fab database may include information related to any of the processes performed in a fab such as tool history, wafer history, and reticle history. A fab database may also include any set of data suitable for use in an overall fab management system. An example of such a system is illustrated in PCT Publication No. WO 99/59200 to Lamey et al. and U.S. Pat. No. 6,408,219 to Lamey, Jr. et al., which are incorporated by reference as if fully set forth herein.

The simulation program may be configured to use the input as described herein. In particular, the method may generate input that can be used by the simulation program to evaluate defect(s) on a reticle and, in particular, how the defect(s) on the reticle may be affected by phase that will be added to the reticle. In addition, the simulation program may use the input to determine how phase not yet added to a reticle will affect optical characteristics of defect(s) detected on the reticle. For example, in one embodiment, the simulation program uses the input to determine the printability that a defect will have after the addition of the phase. In another embodiment, the simulation program uses the input to determine the lithographic significance that a defect will have after the addition of the phase. The method shown in FIG. 1 may include any other step(s) described herein.

As described above, the method shown in FIG. 1 generates input that can be used to analyze a defect and/or to make decisions about a defect on a reticle. In a similar manner, the method described above may be used to generate input that can be used to analyze and/or make decisions about features formed on a reticle. For example, in one embodiment, the input for a simulation program is generated by combining information about one or more features formed on a partially fabricated reticle with information about phase assigned to an area of the reticle proximate to the feature(s). The phase is to be added to the reticle on a level other than a level on which the feature(s) are formed.

In one embodiment, the features include transmission altering features (e.g., chrome lines). The information about the feature(s) may be generated using any metrology technique known in the art (e.g., scanning electron microscopy (SEM), scatterometry, etc.). In addition, the information about the feature(s) may include information about any measurable characteristics of the feature(s) (e.g., critical dimension (CD), sidewall angle, profile, position, etc.). In this manner, like the method described above, the method may be used to generate input that can be used by a simulation program to evaluate feature(s) formed on a reticle and how those feature(s) may be altered by phase that has not yet been added to the reticle. In particular, the simulation program can preferably use the input to analyze how the phase will affect an image of the feature(s) that will be printed on a wafer. For example, the simulation program can determine the printability and/or lithographic significance that the feature(s) will have after phase shifting features are added to the reticle.

Figure 2:
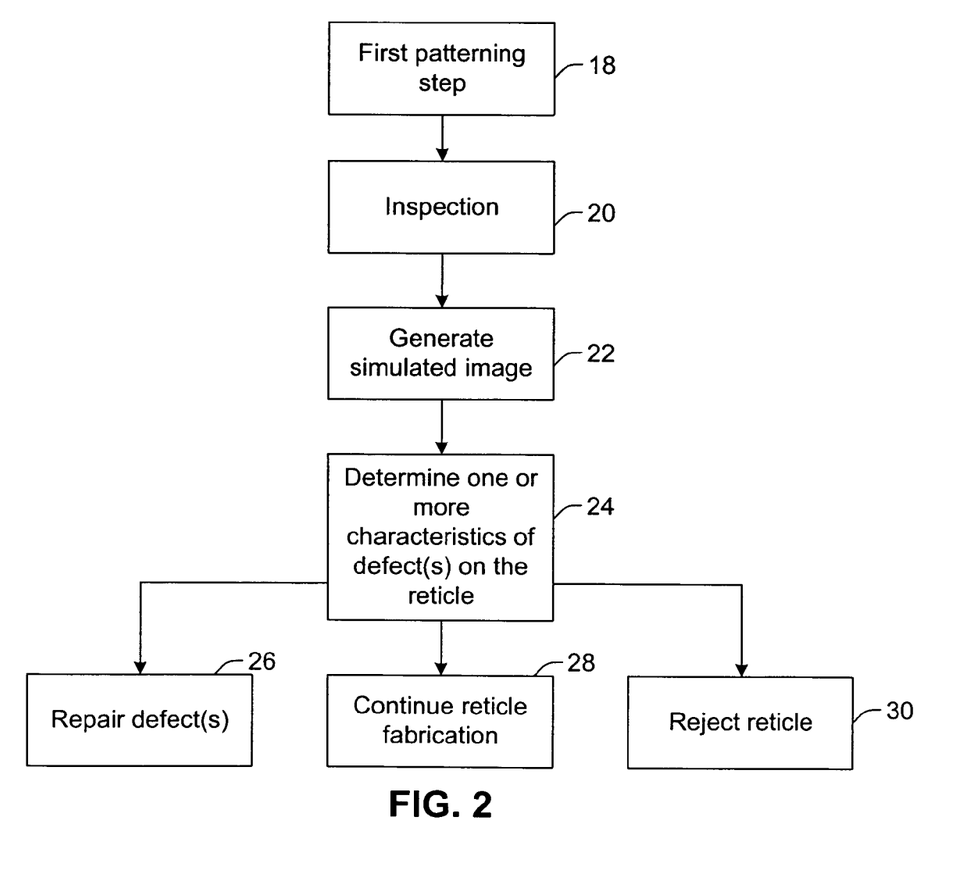
FIG. 2 is a flow chart illustrating one embodiment of a different computer-implemented method.

FIG. 2 illustrates an embodiment of a different computer-implemented method. In some embodiments, the method includes first patterning step 18 of a reticle fabrication process. The first patterning step may be performed as described above. After the first patterning step and before a second patterning step of the reticle fabrication process, inspection 20 is performed on the reticle. In this manner, the inspection is performed on the reticle before the reticle is completely fabricated. As such, inspection 20 may be commonly referred to as "in situ inspection." Inspection 20 detects defects that are formed during and/or before patterning of transmission altering features on the reticle and before patterning of phase altering features. Therefore, it is difficult to know whether or not defects detected in inspection 20 will have some phase altering properties due to their proximity to phase shifting features that will be formed on the reticle. Phase shifting features that are sufficiently proximate to defects to cause alteration of their phase shifting properties may include phase shifting features that will be formed in the same location as defects (i.e., "on top of" the defects) or relatively close to the defects (e.g., adjacent to the defects). Therefore, it would be advantageous to know how the yet to be formed phase altering features will affect the defects, and in particular the optical characteristics of the defects, before additional manufacturing steps are performed on the reticle.

The method shown in FIG. 2 also includes generating a simulated image of a defect on a reticle, as shown in step 22. The simulated image may be generated using any of the simulation programs described herein. In addition, the simulated image is generated using information generated by inspection 20 of one level of the reticle in combination with information about a different level on the wafer. In other words, the simulated image may be generated using input generated according to the method illustrated in FIG. 1. The information generated by inspection 20 may include defect image(s) or any other data that may be generated by reticle inspection. The "one level" of the reticle is defined herein as the level that is formed during the first patterning step. In one embodiment, the one level includes a non-phase shifted level of the reticle. In other words, phase shifting information may be added to the reticle after the inspection. The information about the different level on the wafer may include any information about phase that has yet to be added to the reticle. In particular, the different level includes a phase shifting level that will be added to the reticle in a subsequent patterning step. The information about the different level may include any of the information described above (e.g., information from a database, etc.).

Generating the simulated image may include assigning phase information to one or more defects detected by inspection 20. For example, a position of the defect(s) detected on the reticle may be used to determine phase information of the different level at or near the corresponding position in the different level. The phase information at or near the corresponding position may then be assigned to the defect(s). In addition, the phase information assigned to the defect(s) may be used to simulate one or more characteristics of the defect(s) that the defect(s) will have after the phase shifting features are added in a subsequent patterning step. Defects that correspond to a position on the different level of the reticle that does not include any phase shifting features may have substantially the same characteristics in both the inspection and simulated images. However, defects that correspond to a position on the different level that includes or is proximate to a phase shifting feature may have substantially different characteristics in the inspection and simulated images.

As shown in step 24, the simulated image(s) may be used to determine one or more characteristics that the defects on the reticle will have after additional fabrication of the reticle without actually performing the additional fabrication steps. Therefore, the simulated image(s) may be used to determine valuable information about the defects without the expense of performing the additional fabrication steps. For example, the method may include determining printability of the defect from the simulated image. The printability of the defect specifically refers to how the defect will print on a wafer which is exposed using the reticle. Determining the printability may include simulating an aerial image of the reticle that will be projected onto a resist exposed using the reticle at one or more sets of lithography process parameters. In addition, determining the printability may include simulating a pattern that will ultimately be formed in a resist, which is exposed using the reticle, using one or more sets of lithography process parameters and a resist model. Examples of methods for determining the printability of a reticle defect are illustrated in U.S. patent application Ser. No. 10/793,599 filed Mar. 4, 2004 by Howard et al., entitled "Methods and Systems for Classifying and Analyzing Defects on Reticles," which is incorporated by reference as if fully set forth herein. The simulated images described herein may be used in place of the defect images described by Howard et al.

Furthermore, the method may include determining the process window of the reticle from the simulated image of the defect. For example, the method may include simulating an aerial image that will be projected onto a resist or a pattern that will be formed in a resist across a process window of the lithography process. In other words, the simulations may be performed as described above to determine the printability of the defect, but with lithography process parameters that span a process window of the lithography process. In addition, such simulations may be performed for the entire reticle or a portion of the reticle (e.g., using not just the simulated image of the defect). Such simulations may be performed using information about the reticle (e.g., information about features on the reticle) that may be determined from metrology. The information about the features on the reticle may include any other information described herein. Therefore, the usable process window of the reticle may be determined from the simulated images and compared to the designed process window for the reticle.

In another embodiment, the method shown in FIG. 2 may be used to determine the lithographic significance of one or more defects detected on the reticle using the simulated image. The lithographic significance may be a measure of how the defect impacts a wafer patterned by a lithography process that uses the reticle. In some embodiments, the method may also include using the simulated image to determine design significance of defect(s) on the reticle and/or overall significance of the defect(s) on the reticle. The design significance may be a measure of how the defect impacts a design of the reticle. The overall significance may be selected from the group consisting of lithographically and design significant, lithographically significant only, design significant only, and not significant. Examples of methods for determining the design, lithographic, and/or overall significance of a reticle defect are illustrated in U.S. patent application Ser. No. 10/883,372 filed Jul. 1, 2004 by Marella et al. entitled "Methods and Systems for Inspection of Wafers and Reticles Using Designer Intent Data," which is incorporated by reference as if fully set forth herein.

In another embodiment, the method may include using the simulated image to analyze the electrical impact of the defect on a device that will be fabricated using the reticle. The analysis may include, for example, timing and power analysis. For example, the simulated image of the defect may be used to simulate a device pattern that would be printed on a wafer using the reticle. The device pattern is a pattern that is formed in device materials on the wafer (e.g., insulating materials, conductive materials, semiconductor materials, etc.), as opposed to resist materials that ultimately do not form a device structure on the wafer. Such simulations may include using the simulated image of the defect and other information about the reticle (e.g., reticle layout data and/or information about one or more features of the reticle described further herein) as input to a model for reticle and wafer manufacturing processes (e.g., reticle manufacturing processes and wafer manufacturing processes such as lithography and etch). In other embodiments, the simulating the device pattern may be performed using only the information about one or more features on the reticle. Such information may be acquired as described further herein (e.g., by metrology). In this manner, the method may include generating one or more simulated images of a pattern formed in a device material after etch. In a similar manner, the method may include generating one or more simulated images of a pattern formed in a device material after a different process such as deposition, chemical-mechanical polishing, cleaning, and any other process that affects the characteristics of the device materials on the wafer. The simulated device pattern may then be analyzed to determine the electrical characteristics of the device pattern. The electrical characteristics of the device pattern may then be compared with the designed electrical characteristics to determine the effect of the defect on the electrical performance of the device. In a similar manner, the electrical characteristics may be compared with the designed electrical characteristics to determine the effect of the one or more features of the reticle on the electrical performance of the device.

The method shown in FIG. 2 may also include making one or more decisions about the defect and/or the reticle (i.e., defect and/or reticle "dispositioning"). For example, the method may include determining from the simulated image if the defect should be repaired or not. Deciding whether or not to repair a defect may be based on one or more of the characteristics of the defect that were determined in step 24. For example, if the defect will adversely affect the printability of the reticle, then the defect may be repaired. In addition, if the defect will significantly reduce the process window that can be used with the reticle, then the defect may be repaired. In another example, if the defect has lithographic, design, or lithographic and design significance, then the defect may be repaired. In a further example, if the defect will adversely affect the electrical performance of a device to be fabricated using the reticle, then the defect may be repaired. The decision to repair the defect or not may also take into account other variables such as the cost of repair and the risk of damaging the reticle during repair as described in U.S. Ser. No. 10/793,599. Furthermore, if the defect will cause a defect in the phase shifting layer of the reticle, as described below, then it may be determined that the defect should be repaired prior to formation of the phase shifting layer, particularly since defects in the phase shifting layers of the reticle may be particularly difficult to repair as described by Smith in U.S. Pat. No. 6,593,040, which is incorporated by reference as if fully set forth herein.

If it is determined that the defect(s) should be repaired, then the method may include repairing the defect(s), as shown in step 26. Repairing the defect(s) may be performed using any repair technique or tool known in the art. For example, the defect(s) may be repaired using a focused ion beam (FIB) tool. In addition, the defects may be repaired individually (one defect at a time) or collectively (multiple defects at substantially the same time). Collective defect repair may include, for example, forming a layer of material (e.g., a resist) over parts of the reticle to be protected in the repair process and removing (e.g., etching or cleaning) defects on the exposed portions of the reticle.

In some embodiments, the method may include generating the repair process recipe based on the simulated image(s). For example, the method may include generating a database that can be used by a repair tool to repair the defect(s) on the reticle. Examples of systems and methods for closed loop defect reduction are illustrated in U.S. patent application Ser. No. 10/342,819 by Marella filed on Jan. 15, 2003, which is incorporated by reference as if fully set forth herein. The methods described herein may include one or more step(s) of the methods described in this patent application.

In another embodiment, the method includes determining from the simulated image if the reticle should be rejected or if additional fabrication of the reticle should be performed. The reticle may be rejected (i.e., "scrapped") for a number of reasons. In particular, the decision to reject the reticle or to continue fabrication on the reticle may be based on the one or more characteristics of the defect(s) on the reticle that were determined in step 24. For example, the reticle may be scrapped if a significant number of defects are present on the reticle that will adversely affect the printability of the reticle. In such an example, the reticle may be scrapped particularly if repairing such a significant number of defects is too risky, too expensive, too time consuming, and/or too difficult. In another example, the reticle may be rejected if a significant number of defects are present on the reticle that have lithographic and/or design significance. As described above, the reticle may be scrapped particularly if repairing such defects is too risky, too expensive, too time consuming, and/or too difficult.

Based on the reticle dispositioning decisions made as described above, as shown in step 28, the method may include continuing reticle fabrication on the reticle. Continuing reticle fabrication may include performing a second patterning step of the reticle fabrication process in which, as described further above, phase shifting features or information may be added to the reticle. Additional fabrication steps may also be performed on the reticle after continuation of reticle fabrication. In some embodiments, the method may include modifying the reticle design for subsequent write steps, which are performed during the continued reticle fabrication, to correct defects detected after earlier process steps. In this manner, the defect repair may effectively take place during continued reticle fabrication. In such an embodiment, the method may include creating the file or format for the writer based on the modified reticle design. For example, the modified reticle design may be transformed into a file that can be used by a mask writing tool to print the reticle design on the reticle. In one such example, the method may include transforming the modified reticle design into the form of a MEBES jobdeck, a GDSII file, or OASIS data, which are standard file types for reticle writing tools. Alternatively, as shown in step 30, the method may include rejecting the reticle.

In some embodiments, the method may also include determining one or more parameters of wafer manufacturing processes based on information about the defects on the reticle. The information about the defects used in this step may include the simulated images generated in step 22 and/or the characteristic(s) of the defects determined in step 24. The wafer manufacturing processes may include, for example, lithography (e.g., resist exposure and resist processing) and etch. The parameters of the wafer manufacturing processes that are determined by the method may include, for example, a particular recipe (e.g., process instructions) for a wafer manufacturing process, a particular wafer manufacturing tool (e.g., make and/or model), individual parameters for a particular recipe and/or a particular tool. In this manner, the method may include feedforward control of the wafer manufacturing processes based on information about the defects of the reticle. Preferably, the wafer manufacturing processes are altered by the method to account for the defects (e.g., to mitigate the effects of the defects on the characteristics of the device being fabricated on the wafer).

In another embodiment, the method may include determining a process control recipe based on critical areas in the reticle created by a defect. For instance, if the patterns proximate to a defect are determined to be vulnerable to failure due to the defect, the areas in which the patterns are located may be deemed critical areas and may be given higher priority for monitoring. In addition, the systems and methods described herein may be used to take the output of the locations and description of the vulnerable features from the simulations to automatically create recipes for inspection and/or monitoring of these features.

In another embodiment, the methods described herein include determining a probability of failure of different features of the reticle in manufacturing due to defects of the reticle and creating a process for controlling one or more process conditions of one or more reticle and wafer fabrication processes based on the probability of failure of the different features. Therefore, the methods and systems described herein can be used to create a process control scheme for reticle and device fabrication. For example, the control process may involve not correcting features that are relatively robust, but very tightly controlling features that are vulnerable due to defects of the reticle. This information can also be used to drive the control required for the manufacturing process (for example, the mask writing process) to be pattern specific. For example, the robust features can have wide manufacturing tolerances, but the vulnerable features should have very tight manufacturing processes.

As described above, the method shown in FIG. 2 includes generating simulated images of defects detected on reticles using information about phase to be added to the reticle. In a similar manner, the method described above may be used to analyze and/or make decisions about defects detected on the reticle prior to the first patterning step. For example, inspection of an un-patterned reticle may be performed. Simulated images may then be generated for defects of the un-patterned reticle. These images may be simulated as described above. In addition, one or more characteristics of the defects of the un-patterned reticle may be determined as described above. This method may also include determining from the simulated images of the defects of the un-patterned reticle if the reticle should be rejected or if additional fabrication of the reticle should be performed. Such decisions may be made as described further above. Therefore, defects can be detected in un-patterned reticles and judgment can be made as to whether or not to use the un-patterned reticle even in the first write step.

In another embodiment, the method described above may be used to analyze and/or make decisions about features formed on a reticle using information about phase to be added to the reticle. For example, in one embodiment, a different computer-implemented method includes generating a simulated image of one or more features on one level of a reticle using information about the one or more features generated by metrology in combination with information about a different level of the reticle. The different level is not formed on the reticle prior to the metrology.

In one embodiment, the features may include the features described above and/or any other types of reticle features known in the art. The information about the feature(s) may include the information described above. In addition, the information about the feature(s) may include information about any measurable characteristics of the features (e.g., CD, sidewall angle, profile, position, etc.). In this manner, like the method described above, this method may be used to generate simulated images of the features that can be used to determine one or more characteristics of the feature(s) on the reticle (e.g., printability, design error, error in one or more of the characteristics, error in the reticle fabrication process, etc.). In particular, the simulation program can preferably use the input to analyze how the phase that will be added to the reticle will affect an image of the feature(s) that will be printed on a wafer and/or any other characteristics of the feature(s).

Figure 3:
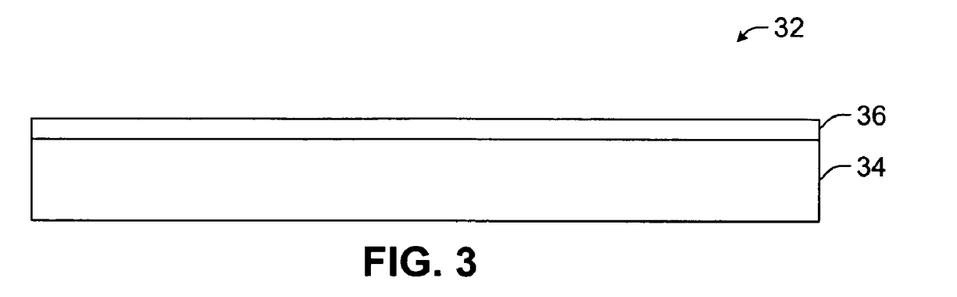
FIG. 3 is a schematic diagram illustrating a partial cross-sectional view of a reticle in which an opaque layer is formed upon a substrate.

FIGS. 3-6 illustrate examples of a reticle at various stages in a reticle manufacturing process that may aid in understanding the methods described above. As shown in FIG. 3, partially fabricated reticle 32 includes substrate 34. Substrate 34 may be formed of a transparent substrate such as glass, borosilicate glass, and fused silica or any other material known in the art. Opaque material layer 36 is formed on substrate 34. The opaque material layer may include chrome or any other appropriate material known in the art.

Figure 4:
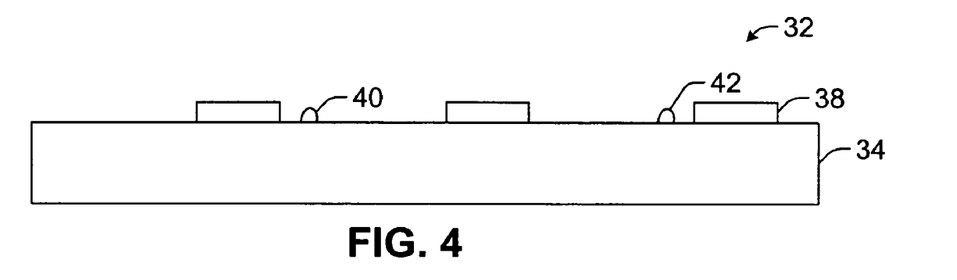
FIG. 4 is a schematic diagram illustrating a partial cross-sectional view of the reticle of FIG. 3 in which the opaque layer is patterned.

As shown in FIG. 4, opaque material layer 36 is patterned (e.g., in a first patterning step) to form opaque features 38. The opaque features impart transmittance (amplitude) information to the reticle. The opaque material layer may be patterned using any method known in the art. For example, a resist layer (not shown) may be formed on the opaque material layer. The resist layer may be patterned to selectively expose portions of the opaque material layer to an etch process. The etch process may be used to pattern the opaque material layer, and then the resist layer may be removed.

As further shown in FIG. 4, defects 40 and 42 were formed on substrate 34 in the first patterning step. Defects 40 and 42 may be, for example, excess chrome located in unwanted positions on the reticle. The excess, unwanted chrome may be produced by a variety of mechanisms such as chrome redeposition during etching or resist defects that manifest in the opaque material layer as defects 40 and 42.

Although defects 40 and 42 have substantially similar characteristics (e.g., substantially the same dimensions, shape, and proximity to features 38), the defects may have dramatically different impacts on the reticle based on their spatial relationship to phase information that is to be added in a subsequent patterning step. For example, information about phase that will be added to the partially fabricated reticle in a subsequent step may be "overlaid" with an image of the defects and/or reticle by a simulation program. As shown schematically in FIG. 5, for example, expected lateral dimensions and positions of phase shifting features 44 may be correlated to positions of the reticle inspection data, which may then be used by a simulation program to determine if phase will be added proximate to defects 40 and 42.

Figure 5:
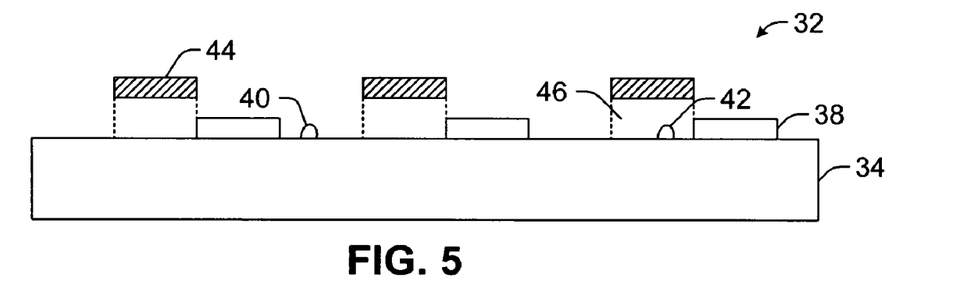
FIG. 5 is a schematic diagram illustrating a partial cross-sectional view of the reticle of FIG. 4 with the overlay of information about phase assigned to different areas of the reticle.

As shown in FIG. 5, defect 40 is not arranged in or proximate to an area on substrate 34 in which any of phase shifting features 44 are expected to be formed. However, defect 42 is arranged in area 46 in which one of the phase shifting features is expected to be formed. Therefore, the simulation program may assign phase to defect 42 based on one or more characteristics of the defect and the phase shifting feature. Since the phase of defect 42 will ultimately be different than the phase of defect 40, the two defects may have dramatically different characteristics (printability, lithographic significance, etc.). In addition, since the methods described herein take into account the expected phase that will be imparted to defects in subsequent patterning steps, the methods may be used to make more intelligent dispositioning decisions about the defect(s) and the reticle.

Figure 6:
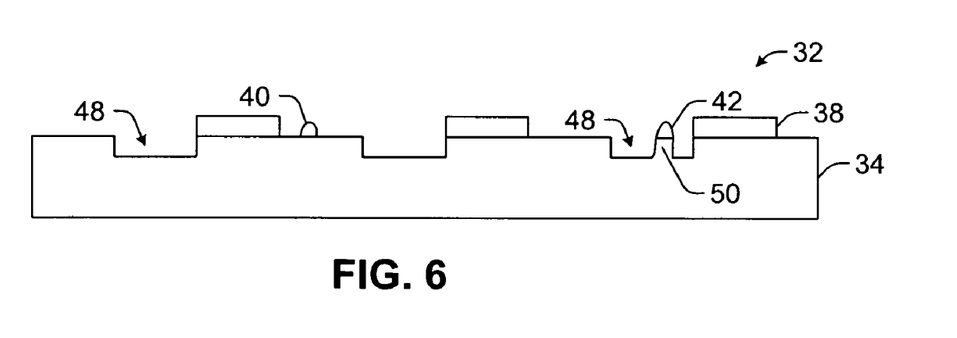
FIG. 6 is a schematic diagram illustrating a partial cross-sectional view of the reticle of FIG. 4 in which phase is added to the reticle.

As shown in FIG. 6, phase shifting features 48 may be formed in the reticle. In this example, the phase shifting features may be formed by patterning a resist (not shown) formed on the reticle shown in FIG. 4 to expose portions of substrate 34 and etching the exposed portions of substrate 34. As further shown in FIG. 6, defect 42 that is located in an area on the reticle in which a phase shifting feature is formed may cause defect 50 in phase shifting feature 48. For example, defect 42 may prevent formation of phase shifting feature 48 in an area under the defect, particularly when a substantially anisotropic and selective etch is used to form phase shifting feature 48. Therefore, even if defect 42 in of itself is considered allowable (such that it is not repaired or does not cause the reticle to be rejected), the defect may cause a defect in phase shifting feature 48 that is significant, and even catastrophic.

As set forth in detail in U.S. Pat. No. 6,593,040 to Smith, defects in phase shifting features may be particularly difficult to repair, for example, due to their transparent nature and/or similarity to the substrate material. Therefore, the methods described herein may include determining if defects detected after one reticle patterning step may cause defects in later patterning steps in which phase is added to the reticle. If defects are expected to cause defects in a phase shifting feature at a later time, the defects may be repaired. As such, the methods described herein may be advantageously used to avoid creating defects in the phase shifting features of a reticle, which can be difficult and expensive to repair.

The methods described herein may have further advantages as described above. For example, the methods described herein are advantageous since they can be used to determine the quality of a reticle as early as possible in the mask making process in order to minimize cycle time and manufacturing costs. In addition, many resolution enhancement techniques (RETs) make use of phase shifting reticles, which require multiple patterning and processing steps as described above. These multiple steps add significant cycle time and manufacturing expense. The methods described herein, therefore, can be advantageously used to determine the quality of a reticle before the completion of all patterning and process steps so as to avoid adding further value to the reticle if a fatal defect exists due to an earlier patterning/process step. This determination can be difficult since a defect generated in the first patterning step may or may not have a phase component that has not yet been added to the reticle since this will occur in later patterning/process steps. Therefore, the methods described herein overcome many of the disadvantages of the previously used methodologies described above since the reticle does not need to be completed in order to estimate a defect's lithographic significance. In addition, is possible to perform a printability assessment on a first level of a reticle after inspection for certain defect types such as local CD variation.

However, the methods described herein make use of the second level patterning data to aid in the determination of the location of phase areas on the reticle, which can be fed forward to an optical lithography simulation program. Furthermore, based upon a priori knowledge of the mask making process and the defect's location relative to the phase pattern information, phase information can be assigned to the defect to improve the accuracy of the simulation results. These methods can be implemented as a component of multi-level database inspection in which the phase information from the database is overlaid with the optical image of the defect and stored to a file that is used as input to the optical simulation program. Therefore, the methods described herein can be operated in a "hybrid" die to die mode in which the second level phase data is database generated and overlaid to the optical image of a defect.

Program instructions implementing methods such as those described herein may be transmitted over or stored on a carrier medium. The carrier medium may be a transmission medium such as a wire, cable, or wireless transmission link. The carrier medium may also be a storage medium such as a read-only memory, a random access memory, a magnetic or optical disk, or a magnetic tape.

In an embodiment, a processor may be configured to execute the program instructions to perform a computer-implemented method according to one or more of the above embodiments. The processor may take various forms, including a personal computer system, mainframe computer system, workstation, network appliance, Internet appliance, personal digital assistant ("PDA"), television system or other device. In general, the term "computer system" may be broadly defined to encompass any device having one or more processors, which executes instructions from a memory medium.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), or other technologies or methodologies, as desired.

Figure 7:
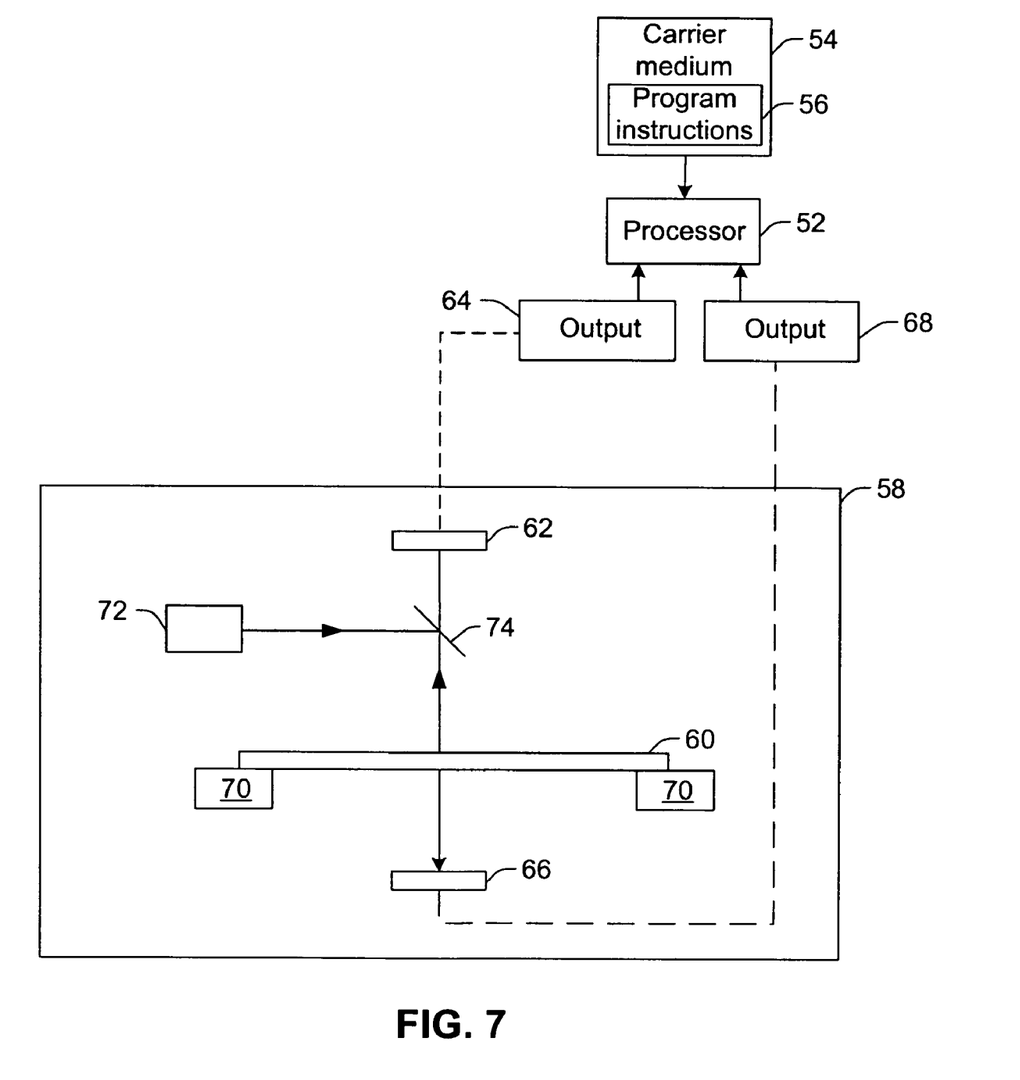
FIG. 7 is a schematic diagram illustrating a side view of one embodiment of a system that may be used to carry out one or more of the methods described herein.

FIG. 7 illustrates one embodiment of a system that can be used to perform one or more of the methods described herein. The system includes processor 52. The processor may include any suitable processor known in the art. For example, the processor may be an image computer, a parallel processor, or another processor described above. The system also includes carrier medium 54. The carrier medium may be configured as described above. For example, carrier medium 54 includes program instructions 56, which are executable on processor 52. The program instructions may be executable for performing any of the embodiments of the methods described above. The program instructions may be further configured as described above.

In some embodiments, the system may also include reticle inspection and/or metrology tool 58. Reticle inspection and/or metrology tool 58 may be configured to detect defects (not shown) on partially fabricated reticle 60 and/or to measure one or more characteristics of features (not shown) formed on partially fabricated reticle 60. Reticle inspection and/or metrology tool 58 may be coupled to processor 52. For example, one or more components of tool 58 may be coupled to processor 52 by a transmission medium (not shown). The transmission medium may include "wired" and "wireless" portions. In another example, detector 62 of tool 58 may be configured to generate output 64. The output may be transmitted across a transmission medium (not shown) from detector 62 to processor 52. In addition, detector 66 of tool 58 may be configured to generate output 68, which may be transmitted across a transmission medium (not shown) from detector 66 to processor 52. In some embodiments, output 64 and 68 may also be transmitted through one or more electronic components (not shown) coupled between the detectors and the processor. Therefore, output 64 and 68 is transmitted from tool 58 to the processor. Output 64 and 68 may include inspection data and/or metrology data. Program instructions 56 may be executable on the processor to perform one or more of the computer-implemented methods described herein using output 64 and/or 68.

Reticle inspection and/or metrology tool 58 includes stage 70 upon which reticle 60 may be disposed during inspection and/or measurements. The stage may include any suitable mechanical or robotic assembly known in the art. Reticle inspection and/or metrology tool 58 also includes light source 72. Light source 72 may include any appropriate light source known in the art. In addition, the tool may include beam splitter 74, which is configured to direct light from light source 72 onto reticle 60 at angles that are approximately normal to an upper surface of reticle 60. The beam splitter may include any suitable beam splitter known in the art. Alternatively, the light source and the tool may be configured such that the light is directed at an oblique angle of illumination to the surface of reticle 60. Detector 62 is configured to detect light reflected from the upper surface of reticle 60 and transmitted by beam splitter 74. Detector 62 is also configured to generate output 64. Detector 66 is configured to detect light transmitted by reticle 60. Detector 66 also generates output 68. In this manner, tool 58 may be configured to detect defects on the reticle using reflected and/or transmitted light. The detectors may include any suitable detectors known in the art.

Although one general configuration of a reticle inspection and/or metrology tool is shown in FIG. 7, it is to be understood that the tool may have any suitable configuration known in the art. For example, the tool may include one of the 8250, 8250-R, or 8450 tools that are commercially available from KLA-Tencor. In addition, the tool may have various configurations such as optical imaging systems, ellipsometer-based systems, scatterometer-based systems, etc. or e-beam systems such as a CD SEM.

Further modifications and alternative embodiments of various aspects of the invention may be apparent to those skilled in the art in view of this description. For example, computer-implemented methods for generating input for a simulation program or generating a simulated image of a reticle are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method, comprising using a computer processor configured to perform the method to perform steps of:
    performing inspection of one level of a reticle before a patterning step of a reticle fabrication process is performed on the reticle such that the inspection is performed on the reticle before the reticle is completely fabricate;
    generating a simulated image of a defect on the reticle using information about the defect generated by the inspection of the one level of the reticle in combination with information about a different level on the reticle, wherein the different level on the reticle is added to the reticle in a step performed subsequent to the inspection of the one level of the reticle;
    using the simulated image to determine one or more characteristics that the defects on the reticle will have after additional fabrication of the reticle; and
    using the one or more characteristics to determine if the reticle should be rejected or if additional fabrication of the reticle should be performed.

2. The method of claim 1, wherein the one level of the reticle comprises a completely unpatterned reticle.

3. The method of claim 1, wherein the inspection is performed after a first patterning step of the reticle fabrication process and before a second patterning step of the reticle fabrication process.

4. The method of claim 1, wherein the information about the different level on the reticle comprises information from a database.

5. The method of claim 1, wherein the one level comprises a non-phase shifted level of the reticle.

6. The method of claim 1, wherein said generating comprises assigning phase information to the defect.

7. The method of claim 1, further comprising determining printability of the defect from the simulated image.

8. The method of claim 1, further comprising determining lithographic significance of the defect from the simulated image.

9. The method of claim 1, further comprising determining a process window of the reticle from the simulated image of the defect.

10. The method of claim 1, further comprising using the simulated image to analyze the electrical impact of the defect on a device that will be fabricated using the reticle.

11. The method of claim 1, further comprising determining from the simulated image if the reticle should be rejected or if the additional fabrication of the reticle should be performed.

12. The method of claim 1, further comprising determining from the simulated image if the defect should be repaired or not.

13. The method of claim 1, further comprising generating a repair process recipe for the defect based on the simulated image, the information about the defect, or a combination thereof.

14. The method of claim 1, further comprising modifying a design of the reticle for one or more write steps to be performed subsequent to the inspection to correct the defect.

15. The method of claim 14, further comprising creating a file for a mask writing tool that can be used to perform the one or more write steps based on the modified design.

16. The method of claim 1, further comprising determining one or more parameters of one or more wafer manufacturing processes based on the simulated image of the defect, the information about the defect, or a combination thereof.

17. The method of claim 1, further comprising determining a process control recipe based on critical areas in the reticle created by the defect and additional defects detected by the inspection.

18. A system, comprising:
a reticle inspection tool configured to generate information about a defect on a reticle by inspection of one level of the reticle performed before a patterning step of a reticle fabrication process is performed on the reticle such that the inspection is performed on the reticle before the reticle is completely fabricated; and
a processor configured to generate a simulated image of the defect using the information about the defect generated by the inspection of the one level of the reticle in combination with information about a different level on the reticle, wherein the different level on the reticle is added to the reticle in a step performed subsequent to the inspection of the one level of the reticle, to use the simulated image to determine one or more characteristics that the defects on the reticle will have after additional fabrication of the reticle, and to use the one or more characteristics to determine if the reticle should be rejected or if additional fabrication of the reticle should be performed.

19. A system, comprising:
a reticle metrology tool configured to generate information about a defect on a reticle by inspection of one level of the reticle performed before a patterning step of a reticle fabrication process is performed on the reticle such that the inspection is performed on the reticle before the reticle is completely fabricated; and
a processor configured to generate a simulated image of the defect using the information about the defect generated by the inspection of the one level of the reticle in combination with information about a different level on the reticle, wherein the different level on the reticle is added to the reticle in a step performed subsequent to the inspection of the one level of the reticle, to use the simulated image to determine one or more characteristics that the defects on the reticle will have after additional fabrication of the reticle, and to use the one or more characteristics to determine if the reticle should be rejected or if additional fabrication of the reticle should be performed.

* * * * *